(12) United States Patent
Becraft et al.

(10) Patent No.: US 6,686,006 B1
(45) Date of Patent: Feb. 3, 2004

(54) AMORPHOUS SILICA IN PACKAGING FILM

(75) Inventors: Michael L. Becraft, Woodstock, MD (US); Nathanael R. Miranda, Spartanburg, SC (US); Drew V. Speer, Columbia, MD (US)

(73) Assignee: Cyrovac, Inc., Duncan, SC (US)

( * ) Notice: Subject to any disclaimer, the term of this patent is extended or adjusted under 35 U.S.C. 154(b) by 0 days.

(21) Appl. No.: 08/857,276

(22) Filed: May 16, 1997

(51) Int. Cl.$^7$ .................. B32B 27/04; B32B 27/18; G21H 5/00
(52) U.S. Cl. .............. 428/35.7; 428/35.9; 428/331; 252/188.28; 426/240; 53/520
(58) Field of Search ............... 428/35.4, 35.7, 428/35.8, 35.9, 215, 218, 219, 220, 411.1, 492, 500, 36.6, 36.7, 331, 446, 447, 448, 450, 451, 453, 457; 252/188.28

(56) References Cited

U.S. PATENT DOCUMENTS

| | | | |
|---|---|---|---|
| 4,062,131 A | 12/1977 | Hsiung | |
| 4,230,595 A | 10/1980 | Yamaji et al. | 252/188 |

(List continued on next page.)

FOREIGN PATENT DOCUMENTS

| | | |
|---|---|---|
| EP | 0 297 538 A2 | 1/1989 |
| EP | B-0 445 301 | 9/1990 |
| EP | 0 520 257 A2 | 6/1992 |
| EP | 0 638 487 A1 | 2/1995 |
| EP | 0 698 563 A1 | 8/1995 |
| EP | 0 794 053 A2 | 2/1997 |
| JP | 800063210 | 5/1980 |
| JP | 55111757 A * | 7/1980 |
| JP | 920046799 | 3/1992 |
| JP | 05247276 A * | 9/1993 |
| JP | 5-247276 | 9/1993 |
| JP | 06080163 A | 3/1994 |
| JP | 6-183920 | 7/1994 |
| JP | 6-263172 | 9/1994 |
| JP | 09025113 A | 1/1997 |
| WO | WO 91/17044 | 11/1991 |
| WO | WO 94/03534 | 2/1994 |
| WO | WO 94/09084 | 4/1994 |
| WO | WO 94/12590 | 6/1994 |
| WO | WO 95/02616 | 1/1995 |
| WO | WO 96/08371 | 3/1996 |
| WO | WO 96/34070 | 10/1996 |
| WO | WO 96/40412 | 12/1996 |
| WO | WO 97/32924 | 9/1997 |
| WO | WO 97/32925 | 9/1997 |
| ZA | 92/4298 | 12/1992 |

OTHER PUBLICATIONS

Vollhardt, K.P.; Chemistry; W.H. Freeman and Company; pp. 967–68, 1987.*
Hawley's Condensed Chemical Dictionary, 13th Edition; Ed. by Lewis; John Wiley & Sons; p. 996, 1997.*
Derwent and GPI Web Abstracts of JP 05247276A, Sep. 24, 1993.*

(List continued on next page.)

*Primary Examiner*—Harold Pyon
*Assistant Examiner*—Sow-Fun Hon
(74) *Attorney, Agent, or Firm*—Mark B. Quatt

(57) ABSTRACT

An article of manufacture includes an oxygen scavenger and an amorphous silica. The article can be in the form of e.g. a film or sealing compound. A package can be made from the article for containing an oxygen-sensitive article such as food. The amorphous silica reduces migration of odor causing by-products of the oxygen scavenging process. A method of making an article of manufacture having reduced migration of by-products of an oxygen scavenging reaction includes providing an article including an oxygen scavenger and an amorphous silica; and exposing the article to actinic radiation.

1 Claim, 2 Drawing Sheets

U.S. PATENT DOCUMENTS

| | | | | |
|---|---|---|---|---|
| 4,230,765 A | * | 10/1980 | Takahashi et al. | 428/283 |
| 4,506,491 A | | 3/1985 | Joosten et al. | 53/426 |
| 4,536,409 A | | 8/1985 | Farrell et al. | 426/398 |
| 4,785,042 A | | 11/1988 | Azuma et al. | 524/210 |
| 4,840,823 A | | 6/1989 | Chigami et al. | |
| 4,865,829 A | | 9/1989 | Hattori et al. | |
| 4,908,151 A | * | 3/1990 | Inoue et al. | 252/188.28 |
| 5,021,515 A | | 6/1991 | Cochran et al. | 525/371 |
| 5,064,698 A | | 11/1991 | Courtright et al. | 428/35.4 |
| 5,075,362 A | | 12/1991 | Hofeldt et al. | 524/72 |
| 5,096,724 A | * | 3/1992 | Zenner et al. | 426/124 |
| 5,106,886 A | | 4/1992 | Hofeldt et al. | 523/100 |
| 5,126,174 A | | 6/1992 | Courtright et al. | 428/34.3 |
| 5,128,060 A | * | 7/1992 | Ueno | 252/184 |
| 5,143,763 A | | 9/1992 | Yamada et al. | 428/36.2 |
| 5,153,038 A | | 10/1992 | Koyama et al. | 428/35.8 |
| 5,204,389 A | | 4/1993 | Hofeldt et al. | 524/72 |
| 5,211,875 A | | 5/1993 | Speer et al. | 252/188.28 |
| 5,227,411 A | | 7/1993 | Hofeldt et al. | 523/100 |
| 5,246,753 A | | 9/1993 | Koyama et al. | 428/36.7 |
| 5,274,024 A | | 12/1993 | Koyama et al. | 524/440 |
| 5,286,407 A | * | 2/1994 | Inoue et al. | 252/188.28 |
| 5,310,497 A | | 5/1994 | Ve Speer et al. | 252/188.28 |
| 5,350,622 A | | 9/1994 | Speer et al. | 428/215 |
| 5,660,761 A | | 8/1997 | Katsumoto et al. | 252/188.28 |
| 5,756,193 A | * | 5/1998 | Yamamoto et al. | 428/220 |
| 5,792,808 A | * | 8/1998 | Sobuttka et al. | 524/450 |
| 5,834,079 A | | 11/1998 | Blinka et al. | 428/35.7 |

OTHER PUBLICATIONS

Derwent and GPI Web Abstracts of JP 55111757A, Feb. 19, 1979.*

Kirk–Othmer Encyclopedia of Chemical Technology, Third Edition, vol. 20, pp. 748–825.

Grace Davison Products, "Silica Gel Application Guide", copyright 1999 W. R. Grace & Co.

Grace Davison Products, "Sylobloc®Silicas", copyright 2000 W.R. Grace & Co.

Grace Davison Products, "How can I use Sylobloc®Products", copyright 1999 W. R. Grace & Co.

"Syloid®Properties, Uses, Production Range", Grace, Dec. 1981.

Aldrich Fine Chemicals, pp. 1179–1181, 1986, Aldrich Chemical Company, Inc.

Grace Davison, "Sylobloc® 250, Anti–Blocking Aid", May 2, 1996.

Grace "EC–Safety Data Sheet", Jan. 1, 1993, pp. 1/5–5/5.

"Perspectives on Active Packaging, Circa 2001", Dr. Aaron L. Brody, Rubbright–Brody, Inc., Jun. 21, 1.

"Interpack '96: A Look Into the Future of Food Packaging", Rubbright–Brody, Inc., Dec. 6, 1996.

"Active packaging—A Japanese perspective", Mr. Yoshiaki Abe, Mitsubishi Gas Chemical Company Limited.

"The Merck Index, an Encyclopedia of Chemicals, Drugs, and Biologicals", Twelfth Edition.

Minimally Processed Refrigerated Fruits & Vegetables, Robert C. Wiley, 1994 Chapman & Hall, Inc.

* cited by examiner

AMORPHOUS SILICA IN PACKAGING FILM

FIELD OF THE INVENTION

The invention generally relates to compositions, articles and methods for scavenging by-products of an oxygen scavenging reaction.

BACKGROUND OF THE INVENTION

It is well known that limiting the exposure of an oxygen-sensitive product to oxygen maintains and enhances the quality and "shelf-life" of the product. In the food packaging industry, several means for regulating oxygen exposure have already been developed.

These means include modified atmosphere packaging (MAP) for modifying the interior environment of a package; gas flushing; vacuum packaging; vacuum packaging combined with the use of oxygen barrier packaging materials; etc. Oxygen barrier films and laminates reduce or retard oxygen permeation from the outside environment into the package interior.

Another method currently being used is through "active packaging." The inclusion of oxygen scavengers within the cavity or interior of the package is one form of active packaging. Typically, such oxygen scavengers are in the form of sachets which contain a composition which scavenges the oxygen through chemical reactions. One type of sachet contains iron compositions which oxidize. Another type of sachet contains unsaturated fatty acid salts on a particulate adsorbent. Yet another type of sachet contains metal/polyamide complex.

One disadvantage of sachets is the need for additional packaging operations to add the sachet to each package. A further disadvantage arising from the use of some sachets is that certain atmospheric conditions (e.g., high humidity, low $CO_2$ level) in the package are required in order for scavenging to occur at an adequate rate.

Another means for limiting the exposure to oxygen involves incorporating an oxygen scavenger into the packaging structure itself. This achieves a more uniform scavenging effect throughout the package. This may be especially important where there is restricted air circulation inside the package. In addition, such incorporation can provide a means of intercepting and scavenging oxygen as it passes through the walls of the package (herein referred to as an "active oxygen barrier"), thereby maintaining the lowest possible oxygen level throughout the package.

One attempt to prepare an oxygen-scavenging wall involves the incorporation of inorganic powders and/or salts in the wall. However, incorporation of these powders and/or salts causes degradation of the wall's transparency and mechanical properties such as tear strength. In addition, these compounds can lead to processing difficulties, especially in the fabrication of thin films, or thin layers within a film structure. Even further, the scavenging rates for walls containing these compounds are unsuitable for some commercial oxygen-scavenging applications, e.g. such as those in which sachets are employed.

Other efforts have been directed to incorporating a metal catalyst-polyamide oxygen scavenging system into the package wall. However, this system does not exhibit oxygen scavenging at a commercially feasible rate.

Oxygen scavengers suitable for commercial use in films of the present invention are disclosed in U.S. Pat. No. 5,350,622, and a method of initiating oxygen scavenging generally is disclosed in U.S. Pat. No 5,211,875. Both applications are incorporated herein by reference in their entirety. According to U.S. Pat. No. 5,350,622, oxygen scavengers are made of an ethylenically unsaturated hydrocarbon and transition metal catalyst. The preferred ethylenically unsaturated hydrocarbon may be either substituted or unsubstituted. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule. More preferably, it is a polymeric compound having three or more ethylenically unsaturated groups and a molecular weight equal to or greater than 1,000 weight average molecular weight.

Preferred examples of unsubstituted ethylenically unsaturated hydrocarbons include, but are not limited to, diene polymers such as polyisoprene, (e.g., trans-polyisoprene) and copolymers thereof, cis and trans 1,4-polybutadiene, 1,2-polybutadienes, (which are defined as those polybutadienes possessing greater than or equal to 50% 1,2 microstructure), and copolymers thereof, such as styrene-butadiene copolymer. Such hydrocarbons also include polymeric compounds such as polypentenamer, polyoctenamer, and other polymers prepared by cyclic olefin metathesis; diene oligomers such as squalene; and polymers or copolymers with unsaturation derived from dicyclopentadiene, norbornadiene, 5-ethylidene-2-norbornene, 5-vinyl-2-norbornene, 4-vinylcyclohexene, or other monomers containing more than one carbon-carbon double bond (conjugated or non-conjugated).

Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds, and unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates. Suitable oxygen scavenging polymers can be made by trans-esterification. Such polymers are disclosed in WO 95/02616, incorporated herein by reference as if set forth in full. The composition used may also comprise a mixture of two or more of the substituted or unsubstituted ethylenically unsaturated hydrocarbons described above. While a weight average molecular weight of 1,000 or more is preferred, an ethylenically unsaturated hydrocarbon having a lower molecular weight is usable, provided it is blended with a film-forming polymer or blend of polymers.

As will also be evident, ethylenically unsaturated hydrocarbons which are appropriate for forming solid transparent layers at room temperature are preferred for scavenging oxygen in the packaging articles described herein. For most applications where transparency is necessary, a layer which allows at least 50% transmission of visible light is preferred.

When making transparent oxygen-scavenging layers according to this invention, 1,2-polybutadiene is especially preferred for use at room temperature. For instance, 1,2- polybutadiene can exhibit transparency, mechanical properties and processing characteristics similar to those of polyethylene. In addition, this polymer is found to retain its transparency and mechanical integrity even after most or all of its oxygen capacity has been consumed, and even when little or no diluent resin is present. Even further, 1,2-polybutadiene exhibits a relatively high oxygen capacity and, once it has begun to scavenge, it exhibits a relatively high scavenging rate as well.

When oxygen scavenging at low temperatures is desired, 1,4-polybutadiene, and copolymers of styrene with butadiene, and styrene with isoprene are especially preferred. Such compositions are disclosed in U.S. Pat. No. 5,310,497 issued to Speer et al. on May 10, 1994 and incorporated herein by reference as if set forth in full. In many cases it may be desirable to blend the aforementioned polymers with a polymer or copolymer of ethylene.

Other oxygen scavengers which can be used in connection with this invention are disclosed in U.S. Pat. Nos. 5,075,362 (Hofeldt et al.), U.S. Pat. No. 5,106,886 (Hofeldt et al.), U.S. Pat. No. 5,204,389 (Hofeldt et al.), and U.S. Pat. No. 5,227,411 (Hofeldt et al.), all incorporated by reference herein in their entirety. These oxygen scavengers include ascorbates or isoascorbates or mixtures thereof with each other or with a sulfite, often sodium sulfite.

Still other oxygen scavengers which can be used in connection with this invention are disclosed in PCT patent publications WO 91/17044 (Zapata Industries) and WO 94/09084 (Aquanautics Corporation), both incorporated by reference herein in their entirety. These oxygen scavengers include an ascorbate with a transition metal catalyst, the catalyst being a simple metal or salt or a compound, complex or chelate of the transition metal; or a transition metal complex or chelate of a polycarboxylic or salicylic acid or polyamine, optionally with a reducing agent such as ascorbate, where the transition metal complex or chelate acts primarily as an oxygen scavenging composition.

Yet other oxygen scavengers which can be used in connection with this invention are disclosed in PCT patent publication WO 94/12590 (Commonwealth Scientific and Industrial Research Organisation), incorporated by reference herein in its entirety. These oxygen scavengers include at least one reducible organic compound which is reduced under predetermined conditions, the reduced form of the compound being oxidizable by molecular oxygen, wherein the reduction and/or subsequent oxidation of the organic compound occurs independent of the presence of a transition metal catalyst. The reducible organic compound is preferably a quinone, a photoreducible dye, or a carbonyl compound which has absorbence in the UV spectrum.

Sulfites, alkali metal salts of sulfites, and tannins, are also contemplated as oxygen scavenging compounds.

As indicated above, the ethylenically unsaturated hydrocarbon is combined with a transition metal catalyst. While not being bound by any particular theory, the inventors observe that suitable metal catalysts are those which can readily interconvert between at least two oxidation states. See Sheldon, R. A.; Kochi, J. K.; "Metal-Catalyzed Oxidations of Organic Compounds" Academic Press, New York 1981.

Preferably, the catalyst is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium II or III. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, caprylate, linoleate, tallate, 2-ethylhexanoate, neodecanoate, oleate or naphthenate. Particularly preferable salts include cobalt (II) 2-ethylhexanoate and cobalt (II) neodecanoate. The metal salt may also be an ionomer, in which case a polymeric counterion is employed. Such ionomers are well known in the art.

The ethylenically unsaturated hydrocarbon and transition metal catalyst can be further combined with one or more polymeric diluents, such as thermoplastic polymers which are typically used to form film layers in plastic packaging articles. In the manufacture of certain packaging articles well known thermosets can also be used as the polymeric diluent.

Polymers which can be used as the diluent include, but are not limited to, polyethylene terephthalate (PET), polyethylene (PE), low or very low density polyethylene, ultra-low density polyethylene, linear low density polyethylene, polypropylene, polyvinyl chloride, polystyrene, and ethylene copolymers such as ethylene-vinyl acetate copolymer, ethylene-alkyl (meth)acrylate copolymer, ethylene-(meth) acrylic acid copolymer, and ethylene-(meth)acrylic acid ionomer. Blends of different diluents may also be used. However, as indicated above, the selection of the polymeric diluent largely depends on the article to be manufactured and the end use. Such selection factors are well known in the art Further additives can also be included in the composition to impart properties desired for the particular article being manufactured. Such additives include, but are not necessarily limited to, fillers, pigments, dyestuffs, antioxidants, stabilizers, processing aids, plasticizers, fire retardants, anti-fog agents, etc.

The mixing of the components listed above is preferably accomplished by melt-blending at a temperature in the range of 50° C. to 300° C. However, alternatives such as the use of a solvent followed by evaporation can also be employed. The blending can immediately precede the formation of the finished article or preform or precede the formation of a feedstock or masterbatch for later use in the production of finished packaging articles.

Although these technologies offers great potential in packaging applications, it has been found that oxygen scavenging structures can sometimes generate reaction byproducts which can affect the taste and smell of the packaged material (i.e. organoleptic properties), or raise food regulatory issues. These by-products can include acids, aldehydes, ketones, and the like.

The inventors have found that this problem can be minimized by the use of amorphous silica which absorbs odor-causing reaction byproducts. The amorphous silica can be incorporated into one or more layers of a multilayer film or container which includes an oxygen scavenging layer. However, one of ordinary skill in the art will readily recognize that the present invention is applicable to any oxygen scavenging system that produces by-products such as acids, aldehydes, ketones, and the like.

DEFINITIONS

"Film" (F) herein means a film, laminate, sheet, web, coating, or the like which can be used to package a product.

For the purposes of this patent, no distinction is made between "absorption" and "adsorption" processes. Both terms shall be taken to mean the sequestering of molecules of gas or liquid on the surface or in the pores of a solid.

"Amorphous silica" herein refers to silica that is free or substantially free of crystalline $SiO_2$ tetrahedra, as measured by x-ray diffraction.

"Oxygen scavenger" (OS) and the like herein means a composition, article or the like which consumes, depletes or reacts with oxygen from a given environment.

"Actinic radiation" and the like herein means electromagnetic radiation capable of causing a chemical change, in any form such as ultraviolet radiation or visible light, and is exemplified in U.S. Pat. No. 5,211,875 (Speer et al.).

"Polymer" and the like herein means a homopolymer, but also copolymers thereof, including bispolymers, terpolymers, etc.

"Ethylene alpha-olefin copolymer" and the like herein means such heterogeneous materials as linear low density polyethylene (LLDPE), linear medium density polyethylene (LMDPE) and very low and ultra low density polyethylene (VLDPE and ULDPE); and homogeneous polymers such as metallocene catalyzed polymers such as Exact™ materials available from Exxon, Tafmer™ materials available from Mitsui Petrochemical Corporation, and Affinity™ resins available from the Dow Chemical Company. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts.

As used herein, the term "polyamide" refers to polymers having amide linkages along the molecular chain, and preferably to synthetic polyamides such as nylons. Furthermore, such term encompasses both polymers comprising repeating units derived from monomers, such as caprolactam, which polymerize to form a polyamide, as well as copolymers of two or more amide monomers, including nylon terpolymers, also referred to generally as "copolyamides" herein.

"EVOH" herein means ethylene/ vinyl alcohol copolymer.

"EVA" herein means ethylene/ vinyl acetate copolymer.

"EBA" herein means ethylene/butyl acrylate copolymer.

"EMA" herein means ethylene/methyl acrylate copolymer.

"PP" herein means polypropylene.

"PE" herein means polyethylene.

SUMMARY OF THE INVENTION

In one aspect of the invention, an article of manufacture comprises an oxygen scavenger and an amorphous silica.

In a second aspect of the invention, a package comprises an oxygen sensitive article, and a container into which the oxygen sensitive article is disposed, the container comprising an oxygen scavenger and an amorphous silica.

In a third aspect of the invention, a method of making an article of manufacture comprises providing an article comprising an oxygen scavenger and an amorphous silica; and exposing the article to actinic radiation.

BRIEF DESCRIPTION OF THE DRAWINGS

The invention may be further understood with reference to the drawings wherein.

DESCRIPTION OF THE PREFERRED EMBODIMENTS

The invention can be used to make various articles of manufacture, compounds, compositions of matter, coatings, etc. Two preferred forms are sealing compounds, and flexible films, both useful in packaging of food and non-food products.

It is known to use sealing compounds in the manufacture of gaskets for the rigid container market. Large, wide diameter gaskets are typically made using a liquid plastisol. This plastisol is a highly viscous, liquid suspension of polymer particles in a plasticizer. In the manufacture of metal or plastic caps, lids, and the like, this liquid plastisol is applied to the annulus of a container such as a jar, and the container with the applied plastisol is "fluxed" in an oven to solidify the plastisol into a gasket. The result is a gasket formed around the annulus of the container.

Smaller gaskets are typically made for use in beer crowns in bottles. A polymer melt is applied by cold molding to the entire inner surface of the crown. Both poly(vinyl chloride) (PVC) and other polymers are used in this application.

Discs for plastic caps are typically made by taking a ribbon of gasket material and making discs, and inserting the discs into the plastic cap.

In all of these applications, the use of an oxygen scavenger and an amorphous silica beneficially provides removal of oxygen from the interior environment of the container, while controlling undesirable by-products of the oxygen scavenging reaction.

Thus, in accordance with the invention, a gasket includes a polymeric composition, an oxygen scavenger, and an amorphous silica.

Figure 1:
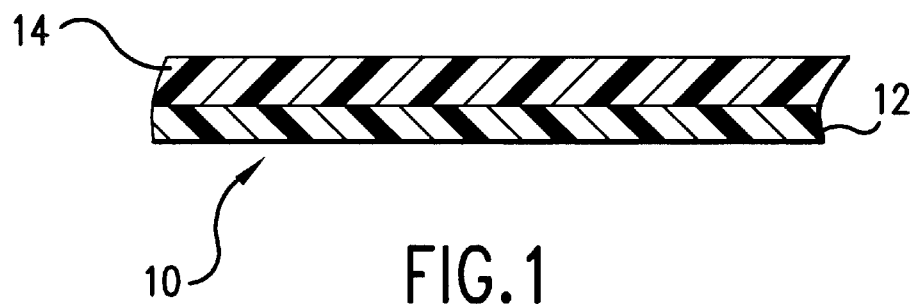
FIG. 1 illustrates a multilayer film embodiment of the invention.

Referring to FIG. 1, a multilayer film 10 is shown, having layers 12 and 14.

Figure 2:
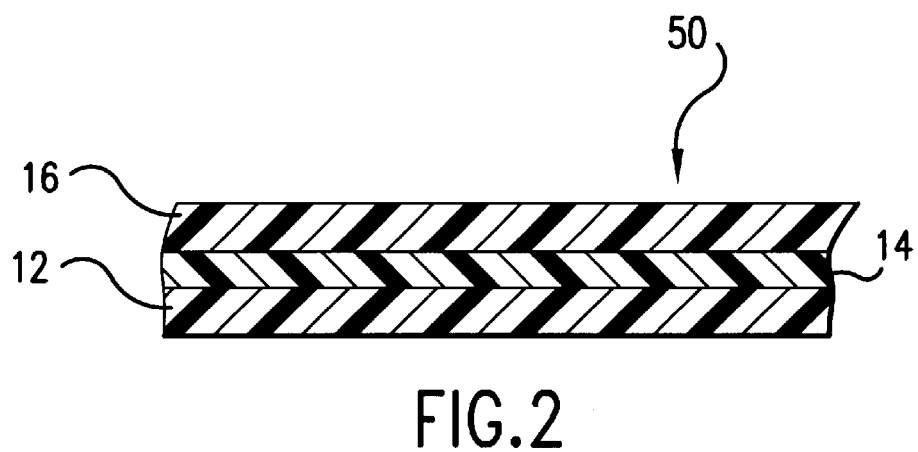
FIG. 2 illustrates another multilayer film embodiment of the invention.

FIG. 2 shows a multilayer film with layers 12, 14, and 16. Layers 12, 14, and 16 are preferably polymeric.

Layer 12 comprises an amorphous silica. Preferred amorphous silicas are those that have a mean pore diameter within a relatively narrow distribution; relatively small pores; and very high surface areas. Pore sizes (mean pore diameter) are preferably less than 200 Å, more preferably less than 100 Å, and most preferably less than 50 Å. A preferred range of mean pore diameter is between 20 and 200 Å, more preferably between 20 and 35 Å. Pore sizes down to 3 Å are possible, and this value represents the practical lower limit of pore size. Surface areas, as measured by BET (Brunauer-Emmett-Teller) methods, are preferably greater than 200 $m^2/g$, more preferably greater than 400 $m^2/g$, and most preferably greater than 600 $m^2/g$. The practical upper limit of surface area is about 1400 square meters per gram. Where the optics of the resulting composition are important, median particle sizes, as measured by light scattering methods, are preferably less than 20 $\mu m$, more preferably less than 10 $\mu m$ and most preferably less than 5 $\mu m$. The practical lower limit of particle size is a particle large enough to have at least one pore. Useful in the present invention are certain grades of amorphous silica available from the Davison division of W.R. Grace & Co.-Conn., and further disclosed herein.

Layer 14 comprises an oxygen scavenger, preferably a polymeric oxygen scavenger, more preferably one of the materials described herein.

Layer 16 comprises an oxygen barrier material, such as ethylene/vinyl alcohol copolymer (EVOH) Saran (e.g. vinylidene chloride/vinyl chloride copolymer or vinylidene chloride/methyl acrylate copolymer), polyester, polyamide, metal, silica coating, etc.

Figure 3:
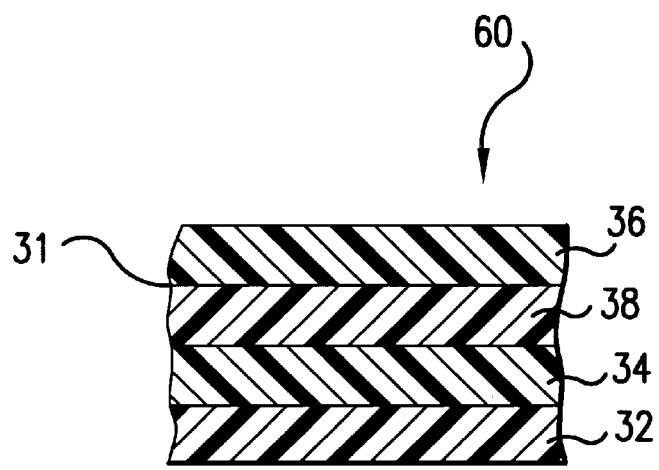
FIG. 3 illustrates a laminate embodiment of the invention.

FIG. 3 shows a laminated film in which a three layer film is adhered to a second film layers 32, 34, and 36 correspond functionally and compositionally to 12, 14, and 16 respectively of FIG. 2, and layer 38 is an intermediate layer which can comprise any polylmeric material such as polyolefin, more preferably ethylenic polymers such as ethylene/alpha-olefin and ethylene/unsaturated ester copolymers, more preferably ethylene/vinyl acetate copolymer. Layer 31 represents a conventional adhesive such as polyurethane adhesive.

Figure 4:
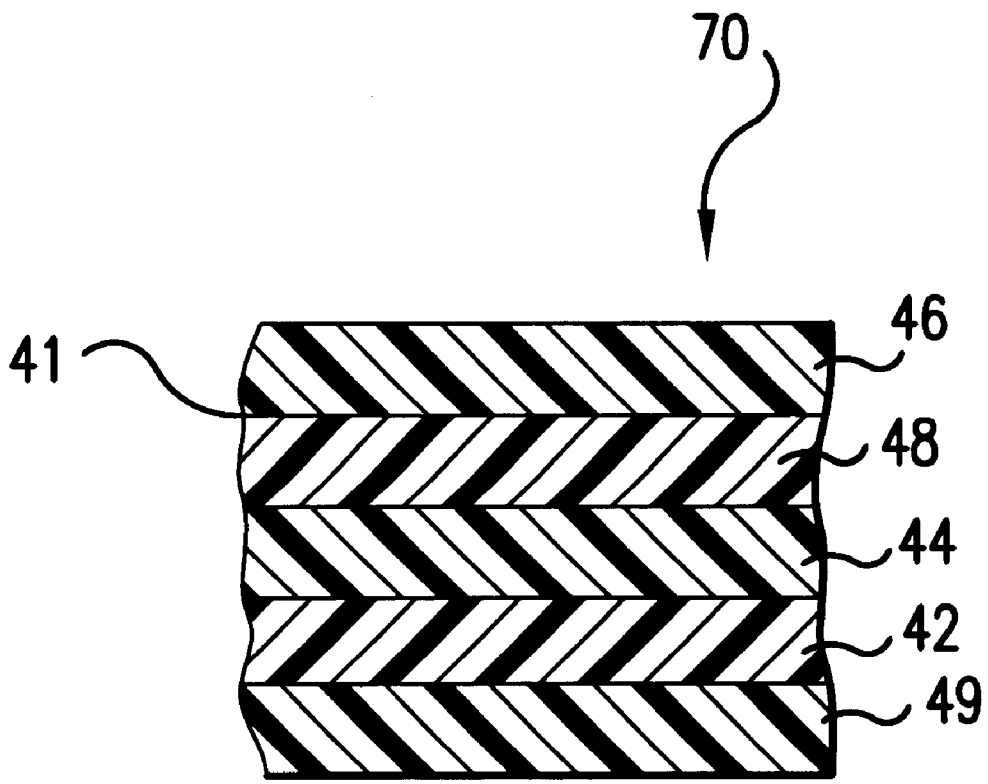
FIG. 4 illustrates another laminate embodiment of the invention.

FIG. 4 shows a laminated film in which a four layer film is adhered to a second film. Layers 42, 44, 46 and 48 correspond functionally and compositionally to layers 32, 34, 36 and 38 respectively of FIG. 3. Layer 49 is an innermost heat sealable layer which can comprise any polymeric material such as polyolefin, more preferably ethylenic polymers such as ethylene alpha-olefin and ethylene/unsaturated ester copolymers, such as ethylene/vinyl acetate copolymer. Layer 46 provides oxygen barrier to the film structure, and adheres to layer 48 by means of conventional adhesive 41. This adhesive corresponds to layer 31 of FIG. 3, and is shown simply as a thickened line. Example 2 and Comparatives 3 and 4 of Table 7 exemplify the laminated film of FIG. 4.

The invention may be further understood by reference to the examples shown below. Tables 1 and 2 identify the materials used in the examples. The remaining tables describe the films made with these materials, and organoleptic or migration data resulting from testing some of these films.

TABLE 1

| MATERIAL | TRADENAME | SOURCE | DESCRIPTION |
|---|---|---|---|
| $S_1$ | Sylobloc ® 45 | Grace Davison | amorphous silica |
| $S_2$ | Syloid ® 63 | Grace Davison | amorphous silica |
| $S_3$ | Syloid ® 74 | Grace Davison | amorphous silica |
| $S_4$ | Syloid ® 234 | Grace Davison | amorphous silica |
| $S_5$ | Syloid ® 244 | Grace Davison | amorphous silica |
| $S_6$ | Syloid ® 308 | Grace Davison | amorphous silica |
| $S_7$ | Sylobloc ® 44 | Grace Davison | amorphous silica |
| $S_8$ | Sylobloc ® S200 | Grace Davison | amorphous silica |
| $S_9$ | Syloid ® 63 modified | Grace Davison | amorphous silica |
| $S_{10}$ | Syloid ® 74x6000 | Grace Davison | amorphous silica |
| $Z_1$ | 10417-12 zeolite concentrate | Colortech | masterbatch of 80% LLDPE and 20% UOP Abscents ® 2000 zeolite |
| $Z_2$ | ZSM-5 | Grace Davison | zeolite |
| $Z_3$ | USY | Grace Davison | zeolite |
| $PE_1$ | Exact ® 4150 | Exxon | metallocene catalyzed PE, an ethylene/1-hexene copolymer with a density of 0.895 gm/cc |
| $PE_2$ | Exceed ® 350D60 | Exxon | metallocene catalyzed PE, an ethylene/1-hexene copolymer with a density of 0.917 gm/cc |
| $PE_3$ | SLP-9063 | Exxon | metallocene catalyzed PE, an ethylene/1-hexene copolymer with a density of 0.902 gm/cc |
| $PE_4$ | Poly-eth 1017 | Chevron | low density PE |
| $PE_5$ | AC-9A | Allied | PE powder |
| $PP_1$ | Oppera ® PP6102 | Exxon | polypropylene |
| $PP_2$ | Escorene ® PD4182.E3 | Exxon | polypropylene |
| $EV_1$ | LD-318.92 | Exxon | ethylene/vinyl acetate copolymer with 9 wt. % vinyl acetate comonomer |
| $EV_2$ | PE 1375 | Rexene | ethylene/vinyl acetate copolymer with 3.6 wt. % vinyl acetate comonomer |
| $EB_1$ | Lotryl ™ 30BA02 | Atochem | ethylene/butyl acrylate copolymer with 30 wt. % butyl acrylate copolymer |
| $AD_1$ | Adcote ™ 530 and Coreactant 9L23 | Morton International | mixture of silane, iso-cyanate, glycol, and alkyl acetate |
| $OS_1$ | VECTOR ™ 8508-D | Dexco | styrene/butadiene copolymer with 30 wt. % styrene comonomer and 70 wt. % butadiene comonomer |
| $TC_1$ | cobalt oleate | Shepherd | a transition metal catalyst |
| $TC_2$ | cobalt stearate | Shepherd | a transition metal catalyst |
| $PI_1$ | benzoylbiphenyl | — | photoinitiator |
| $PI_2$ | trisbenzoyl-triphenylbenzene | — | photoinitiator |
| $AO_1$ | Irganox ™ 1076 | Ciba-Geigy | antioxidant |
| $F_1$ | 50m-44 Mylar ™ | DuPont | Saran-coated polyethylene terephthalate film |

The mean pore diameters of Table 2 were determined by nitrogen porosimetry.

TABLE 2

Characterization of Potential By-Product Absorbers

| Material | Median Particle Size ($\mu m$) | Mean Pore Diameter (Å) | Pore Volume (cc/g) | BET Surface Area ($m^2/g$) |
|---|---|---|---|---|
| Sylobloc ® 45 | 4.3 | | 1.2 | |
| Syloid ® 63 | 7.2 | 26 | 0.4 | 650–720 |
| Syloid ® 74 | 9 | 150 | 1.2 | 300–350 |
| Syloid ® 234 | 5.4 | 180 | 1.7 | 380 |
| Syloid ® 244 | 4 | | 1.6 | |
| Syloid ® 308 | 4 | | 1.2 | |
| Sylobloc ® 44 | 4 | | 1.5 | |

TABLE 2-continued

Characterization of Potential By-Product Absorbers

| Material | Median Particle Size ($\mu$m) | Mean Pore Diameter (Å) | Pore Volume (cc/g) | BET Surface Area (m$^2$/g) |
|---|---|---|---|---|
| Sylobloc ® S200 | 3 | | 0.6 | 500 |
| Syloid ® 63 modified | 7 | 35 | 0.1 | 136 |
| Syloid ® 74x6000 | 4 | | | |
| Abscents ® 2000 | 3–5 | 6.5 | | >400 |
| ZSM-5 | 1–5 | 5.4 | | |
| USY | 1–5 | 7.4 | | |

Certain materials were blended together for some of the film structures, and these blends are identified as follows:

$SB_1 = 80\% \ PE_1 + 16\% \ PE_3 + 4.0\% \ S_2$.
$SB_2 = 80\% \ PE_2 + 16\% \ PE_3 + 4.0\% \ S_2$.
$SB_3 = 80\% \ PE_1 + 16\% \ PE_4 + 4.0\% \ S_2$.
$SB_4 = 80\% \ PE_2 + 16\% \ PE_4 + 4.0\% \ S_2$.
$ZB_1 = 80\% \ PE_1 + 20\% \ Z_1$.
$ZB_2 = 80\% \ PE_2 + 20\% \ Z_1$.
$ZB_3 = 80\% \ PE_1 + 12.8\% \ PE_3 + 3.2\% \ PE_4 + 4.0\% \ Z_2$.
$ZB_4 = 80\% \ PE_2 + 12.8\% \ PE_3 + 3.2\% \ PE_4 + 4.0\% \ Z_2$.
$ZB_5 = 80\% \ PE_1 + 12\% \ PE_4 + 4\% \ PE_5 + 2\% \ Z_2 + 2\% \ Z_3$.
$ZB_6 = 80\% \ PE_2 + 12\% \ PE_4 + 4\% \ PE_5 + 2\% \ Z_2 + 2\% \ Z_3$.
$PPB_1 = 60\% \ PP_1 + 40\% \ EB_1$.
$PPB_2 = 60\% \ PP_2 + 40\% \ EB_1$.
$OSB_1 = 50\% \ EV_1 + 40\% \ OS_1 + 8.83\% \ EV_1 + 1.06\% \ TC_1 + 0.10\% \ PI_1 + 0.01\% \ AO_1$.
$OSB_2 = 50\% \ EV_1 + 40\% \ OS_1 + 8.83\% \ EV_1 + 1.06\% \ TC_2 + 0.10\% \ PI_2 + 0.01\% \ AO_1$.

By-Product Control

A headspace gas chromatography (GC) method was used to determine the ability of a material to absorb aldehydes. Between 6.0 and 6.6 mg of as-received powdered silica was placed in a 22 mL headspace GC vial. 2 $\mu$L of an aldehyde mixture in methanol was injected into each vial. The mixture consisted of about 0.1% each of the indicated aldehydes. Control vials contained just the aldehyde mixture and no powdered silica. The vials were held at 80° C. for 1 hour prior to injection into a GC unit. The data in Tables 3 and 4 shows the percent change in the aldehyde concentration for each material relative to the control.

TABLE 3

Percent of Aldehydes Absorbed by Candidate Absorbers

Percent Change Relative to Aldehyde Control

| Material | Propenal | Hexanal | Heptanal | Octanal | Total Volatiles |
|---|---|---|---|---|---|
| $S_1$ | −80 | −83 | −97 | −95 | −69 |
| $S_2$ | −63 | −98 | −99 | −99 | −47 |
| $S_3$ | −67 | −65 | −85 | −96 | −54 |
| $S_4$ | 0 | −65 | −77 | −91 | −23 |
| $S_5$ | 0 | −51 | −77 | −86 | −22 |
| $S_6$ | 0 | −57 | −74 | −83 | −21 |

TABLE 4

Percent of Aldehydes Absorbed by Candidate Absorbers

Percent Change Relative to Aldehyde Control

| Material | Propenal | Pentanal | Hexanal | Heptanal | Octanal |
|---|---|---|---|---|---|
| $S_7$ | 0 | −44 | −64 | −80 | −89 |
| $S_8$ | 0 | −67 | −85 | −96 | −98 |
| $S_9$ | −25 | −45 | −62 | −80 | −90 |
| $S_{10}$ | −39 | −53 | −67 | −83 | −91 |

The data in Tables 3 and 4 indicate that $S_1$ and $S_2$ are particularly effective in absorbing a wide range of aldehydes as well as a substantial portion of the methanol used as a carrier; that $S_4$, $S_5$, and $S_6$ are less effective, particularly with low molecular weight aldehydes; and that there are distinct differences in the ability of various silicas to absorb different aldehydes.

Organoleptics

In Table 5, a six-layer laminate structure in accordance with the invention, and two comparative six-layer laminate structures, are disclosed. The six-layer structures were each made by laminating a coextruded five-layer film, using a conventional adhesive, to a second film (=layer 6).

TABLE 5

| EXAMPLE | STRUCTURE |
|---|---|
| 1 | $SB_1/PPB_1/OSB_1/SB_2/PE_2//AD_1//F_1$ |
| COMP. 1 | $ZB_1/PPB_1/OSB_1/ZB_2/ZB_2//AD_1//F_1$ |
| COMP. 2 | $ZB_3/PPB_1/OSB_1/ZB_4/PE_2//AD_1//F_1$ |

The target (and approximate actual) gauge (in mils) of each layer of the laminate structure of the invention and the comparatives was:

| layer 1 | layer 2 | layer 3 | layer 4 | layer 5 | adhesive | layer 6 |
|---|---|---|---|---|---|---|
| 0.15 | 0.15 | 0.50 | 0.80 | 0.40 | (minimal) | 0.50 |

The films were triggered by ultraviolet light according to the procedure disclosed in U.S. Pat. No 5,211,875. The films were converted into packages on a Multivac® R7000 packaging machine. Cryovac® T6070B film was used as the bottom web of the packages. Each package contained one slice of turkey. Each package was flushed with a gas mixture consisting of 99% $N_2$ and 1% $O_2$. Packages were stored in the dark for 7 days at 40° F.

A sensory panel rated the taste of the turkey slices. The scale ranged from 1 to 6, with 1 indicating extreme off-flavor and 6 indicating no off-flavor. The average scores are summarized in Table 6.

TABLE 6

| Film | Average Score |
|---|---|
| 1 | 4.3 |
| COMP. 1 | 3.1 |
| COMP. 2 | 3.2 |

In Table 7, a five-layer laminate structure in accordance with the invention, and two comparative five-layer laminate structures, are disclosed. The five-layer structures were each made by laminating a coextruded four-layer film, using a conventional adhesive, to a second film (=layer 5).

TABLE 7

| EXAMPLE | STRUCTURE |
|---------|-----------|
| 2 | $SB_3/PPB_2/OSB_2/SB_4//AD_1//F_1$ |
| COMP. 3 | $PE_1/PE_1/OSB_2/EV_2//AD_1//F_1$ |
| COMP. 4 | $ZB_5/PPB_2/OSB_2/ZB_6//AD_1//F_1$ |

The target (and approximate actual) gauge (in mils) of each layer of the laminate structure of the invention and the comparatives was:

| layer 1 | layer 2 | layer 3 | layer 4 | adhesive | layer 5 |
|---------|---------|---------|---------|----------|---------|
| 0.15 | 0.15 | 0.50 | 1.00 | (minimal) | 0.50 |

The films were triggered, converted into packages, and evaluated in the same manner described above for Examples 1, Comp. 1, and Comp. 2. Table 8 summarizes the percentage of the panelists which gave a score of 5 or 6 to the packaged turkey slices.

TABLE 8

| Film | Percentage of Panelists which gave a Score of 5 or 6 |
|------|-----------------------------------------------------|
| 2 | 68% |
| COMP. 3 | 6% |
| COMP. 4 | 43% |

The data of Tables 6 and 8 demonstrate that amorphous silicas can significantly reduce the off-flavor caused by by-products of the oxygen scavenging reaction.

Films of the invention can been made by any conventional means, including coextrusion, lamination, extrusion coating, or corona bonding, and then optionally irradiated and/or oriented. They can be made heat shrinkable through orientation by e.g. trapped bubble or tenterframing methods if desired, at orientation ratios of 1:2 to 1:9 in either or both of the machine and transverse directions. For shrink applications, they can be made to have a free shrink of at least 10%, more preferably at least 20%, most preferably at least 30%, in either or both directions at 90° C.

Gasket compositions of the invention can be made by any conventional process, including, but not limited to, extrusion compounding for thermoplastic compositions, and conventional mixing equipment for plastisol compositions. The gasket compositions of the invention can then be formed into gaskets on lids by any conventional process, including but not limited to, cold molding processes, inserted discs, application of liquid plastisols via pressurized nozzles followed by solidification in an oven, etc.

Various changes and modifications may be made without departing from the scope of the invention defined below. For example, a blend of different amorphous silicas can be used in the same article (e.g. film or sealing compound). In films, although it is preferred that the amorphous silica be used in the film and as a packaging material such that the amorphous silica is disposed closer to the contents of the package, which can be food or any oxygen-sensitive product, than the oxygen scavenger, there may be applications where the amorphous silica is disposed "outside of" the oxygen scavenger, such that the oxygen scavenger-containing layer is disposed closer to the contents of a package made from the film, than the silica-containing layer. The amorphous silica can alternatively be disposed on both sides of the oxygen scavenger. Also, within the same film, a first amorphous silica can be used in a first layer, and a second amorphous silica, different from the first amorphous silica, can be used in another layer of the film.

Alternatively, the amorphous silica, in addition to or instead of the arrangements described above, can be disposed in the same layer or layers as the oxygen scavenging material. Thus, by way of example, any of layers 14, 34, and 44 of the examples and figures can include any suitable percent, by weight of the layer, of an amorphous silica or blend of amorphous silicas. A preferred blend of oxygen scavenging and amorphous silica in such a blend layer is between 95% and 99.5% oxygen scavenger, and between 0.5% and 5% amorphous silica or blend of amorphous silicas. Any suitable polymeric materials can be employed in films containing the amorphous silica, and are not limited to those listed herein.

The amount of amorphous silica used in a film of the present invention is preferably between 0.1 % and 5% of the layer in which it occurs. These percentages are based on the amorphous silica per se, with suitable adjustment to be made if the amorphous silica is used as a masterbatch with another material such as polyethylene. Above 5% of the layer, optics of the film can be compromised to some extent, although the film can still be used in many applications. In end-use applications where optics are not a critical feature of the package, such as opaque films or gaskets for containers, higher amounts of amorphous silica can be beneficially used.

Amorphous silica disclosed herein can be used with or in films or coatings, or absorbed into a variety of supports for scavenging or other uses, such as a layer or coating on another object, or as a bottle cap or bottle liner, as an adhesive or non-adhesive insert, sealant, gasket, fibrous matte or other inserts, or as a non-integral component of a rigid, semi-rigid, or flexible container.

What is claimed is:

1. A method of making an article of manufacture comprising:
   a) providing an article comprising a blend of:
      i) an oxygen scavenger comprising a material selected from the group consisting of:
         (a) an oxidizable compound and a transition metal salt,
         (b) an ethylenically unsaturated hydrocarbon and a transition metal catalyst,
         (c) an ascorbate,
         (d) an isoascorbate,
         (e) a sulfite,
         (f) an ascorbate and a transition metal catalyst, the catalyst comprising a simple metal or salt, or a compound, complex or chelate of the transition metal,
         (g) a reduced form of a quinone, a photoreducible dye, or a carbonyl compound which has absorbence in the UV spectrum, and
         (h) a tannin; and
      ii) an amorphous silica; and
   b) exposing the article to actinic radiation; wherein the amorphous silica has:
      (i) a mean pore diameter of less than 200 Angstroms,
      (ii) a median particle size of less than 20 $\mu$m, and
      (iii) a surface area of greater than 200 $m^2$/gram.

* * * * *